Jan. 5, 1965   R. K. RUMBLE   3,164,409
SEAT BELT ASSEMBLY
Filed April 20, 1962
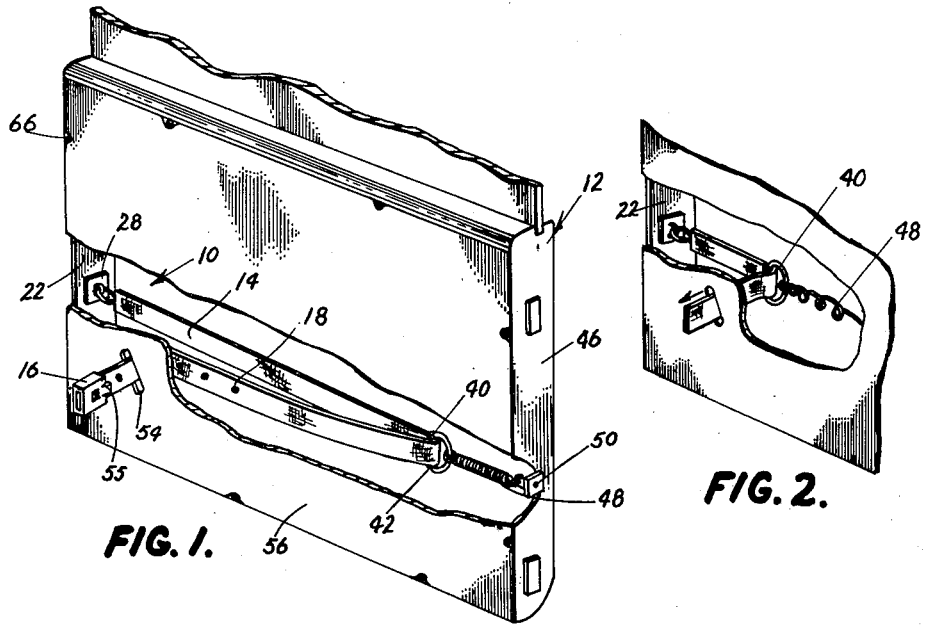
FIG. 1.
FIG. 2.
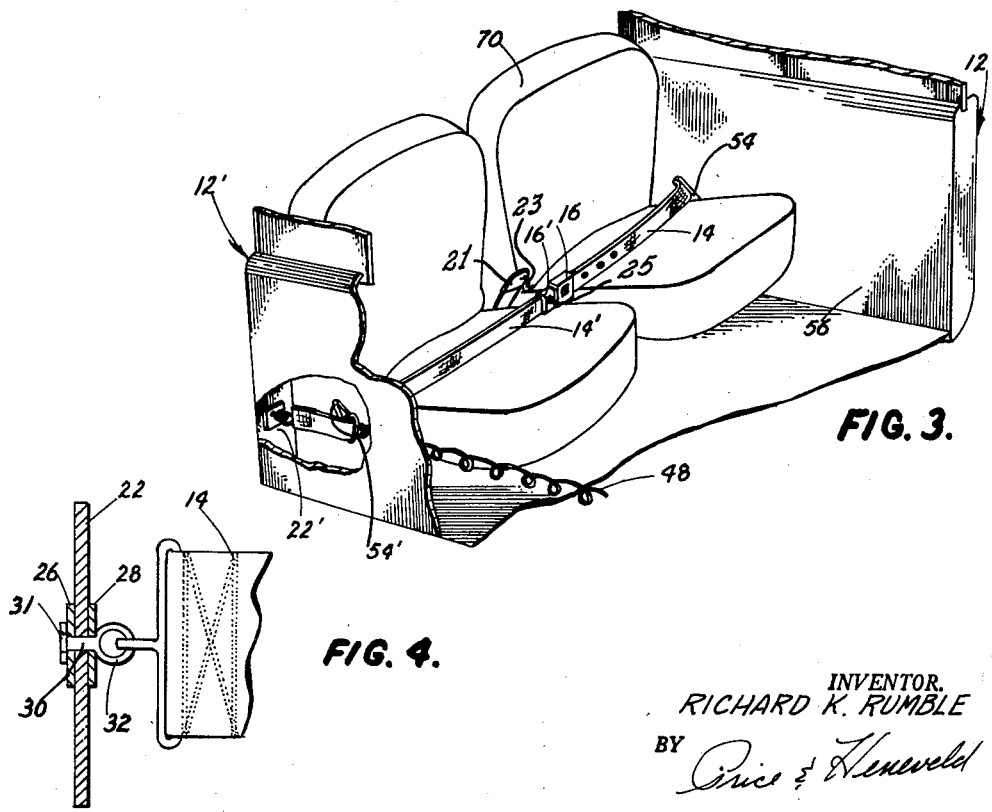
FIG. 3.
FIG. 4.
INVENTOR.
RICHARD K. RUMBLE
BY
ATTORNEYS

United States Patent Office 3,164,409
Patented Jan. 5, 1965

3,164,409
SEAT BELT ASSEMBLY
Richard K. Rumble, 1640 Laurel S.E.,
Grand Rapids, Mich.
Filed Apr. 20, 1962, Ser. No. 189,128
4 Claims. (Cl. 297—388)

This invention relates to vehicle safety belts, and more particularly to a safety belt for holding passengers in position on their seats, especially in an automobile, and also capable of preventing automobile doors from being thrown open.

Automobile safety belts, to be sufficiently sturdy to be effective, must be secured to a rigid, strong portion of the automobile body. Conventional belts are fastened to the floor of the body. When the belts are not in use, therefore, they either lie across the seats or are crumpled up on the floor. If they lie on the seats, the belts are very discomforting to a person entering the automobile. After sitting, the person must straighten his body to a rigid position and pull the belt and buckle out from behind and beneath him. Even if he does not wish to use the belt, there is no convenient place to position it. Further, the belt often catches in the automobile door after the person enters and closes the door. If on the other hand, the belts lie on the floor, they lie between the seat and the door, and are difficult to locate and retrieve after the person is sitting. These factors add up to a significant nuisance situation which is so real that most automobile owners will not own seat belts, even though facts show that seat belts often save lives.

Consequently, various attempts are made to make seat belts handier and more convenient to use, and more convenient when not in use. These attempts include the adaptation of wind up reels and the like to retract the belt out of the way, e.g. under the seat. However, such devices often do not lend sufficient strength to be of value when needed most, i.e. under a high impact situation. Further, such mechanisms are relatively expensive and include complex parts which are prone to fail after a period of time. Moreover, the belt ends are difficult to find under or adjacent the seat. Thus, it will be readily realized that the qualities of (1) simplicity, (2) strength and (3) inexpensiveness are normally inconsistent with the other desired qualities of (4) convenience of the belt when in use and (5) when not in use.

It is an object of this invention to provide an automobile seat belt assembly that is extremely convenient to use, and is further conveniently unbothersome when not in use by people in the automobile. It is never in the way. It never lies across the seat to irriate an entering passenger. If not used by the passenger, it remains in a neat retracted condition where it cannot catch in the door, irritate the passenger, or be unsightly. The novel assembly enables the belt to be conveniently grasped without having to feel around on the floor of the automobile, and without having to open the door to see it.

It is another object of this invention to provide a novel seat belt assembly that is not only convenient in use, or when not used, but which also is extremely sturdy in construction. It is capable of withstanding tremendously high impact loads since it is fastened to one of the heaviest gauge and well supported steel parts of the automobile. It is not dependent upon complex locking mechanisms to hold in a crash, in spite of the fact that it is retractable out of the way when not in use.

It is another object of this invention to provide a sturdy seat belt construction which is retractable inside the inner lining panel of the vehicle, especially into the door body of an automobile, to thereby be very convenient in use and to use the normally dead space beneath the window assembly.

It is another object of this invention to provide a seat belt assembly which is not only retractable and extremely sturdy, but which is almost the ultimate in simplicity. The necessary parts are few and simple in structure. The parts are dependable over a long period of time. The strength of the belt does not depend in any way on the strength of the retracting mechanism. The device when retracted is almost entirely out of view with only enough showing to enable convenient grasping for use. The belt does not detract from an otherwise neat automobile interior.

It is a further object of this invention to provide a seat belt that is capable of performing a dual function of holding passengers in position, and also preventing the doors of the automobile from flying open in a collision or roll-over. The belt thereby prevents someone from getting thrown out of the car, or losing his arm or leg due to an open door.

It is still a further object of this invention to provide a safety belt assembly that, in spite of its uniqueness in achieving (1) convenience of use, (2) convenience when not used, (3) extra strength, (4) simplicity of structure, (5) dual function, (6) smooth dependable operation over a long life, and (7) optimum height, also provides a belt that is completely inexpensive, and is simple to install on a new vehicle, or on a used vehicle.

It is another object of this invention to provide a simple, dependable safety belt apparatus that can readily be substituted for a conventional arm rest of an automobile; can be secured inside the door for optimum strength, is aesthetically appealing, and can be installed easily without even removing the inner door panel.

These and other objects of this invention will be apparent upon studying the following specification in conjunction with the drawings in which:

FIG. 1 is a perspective, partially sectioned view of an automobile door embodying one of the two like cooperating portions of the novel seat belt assembly;

FIG. 2 is a fragmentary, sectional view of the door illustrated in FIG. 1, showing the seat belt portion being extended;

FIG. 3 is a fragmentary, perspective, partially sectioned view of the seat belt assembly in the extended position and connected between the sides of the automobile across the seat;

FIG. 4 is a fragmentary, sectional view of the attachment of the seat belt to the rear panel of the door.

Basically, the inventive seat belt apparatus comprises a pair of like belt portions interconnectable when extended across the seat, and retractable behind the inner panel of a vehicle, especially into the door of an automobile to utilize the dead air space beneath the window assembly. Each of the belt portions extends through an opening adjacent the seat, i.e. adjacent the rear half of the inner panel, passes through a movable guide and keeper element, extensibly attached at a first position, and doubled back to be attached at a second position spaced from the first position, preferably to the rear end panel of the door.

Referring to the drawings, in FIG. 1 is disclosed one embodiment of the invention showing one portion 14 of the seat belt assembly 10, mounted in door 12 of an automobile. The belt may be of any conventional type, usually cloth, and includes a conventional connecting or buckle means 16, shown as a female member, at the inner end thereof to connect with a second connecting means 16', shown as a male member, on belt portion 14' (FIG. 3) extending from behind the panel of the opposite door 12'. This connecting means 16–16' may be any conventional type of buckle arrangement as is desired. Also, belt 14 has a slack adjustment feature which may utilize a series of openings 18, for example. Since the connecting and slack adjustment features are only incidental to the invention, detailed descriptions thereof would only unnecessarily complicate the specification, and are not given.

Each of the belt portions preferably has its outer or supporting end affixed to the rear end panels 22 and 22' of the respective doors 12 and 12'. These end panels, since conventionally formed of heavy gauge steel and being quite narrow between the inner and outer panels, serve as excellent mounting means for the belt ends. It may be desired to use one or more reinforcing plates 26 and 28 to even further strengthen the connection. A suitable stud 30 extending through an opening provided in panel 22 may serve to mount the belt. The stresses on the stud are axial, thus enabling the stud to handle a large force. Connection of the cloth belt 14 to the mounting means may include a pair of interfitting rings 32 or any equivalent. Obviously, this particular connection may be modified in several ways without departing from the principles taught.

When not in use, the belt 14 assumes the retracted position shown in FIG. 1 from the rear panel 22 forwardly to a position adjacent the front panel where it interfits with keeper element 40. The keeper preferably includes a roller element 42 or other suitable sliding surface over which belt 14 can readily move. The particular shape of this keeper can be varied.

Keeper 40 is connected to the front end panel 46 through an extensible biasing means 48 which preferably comprises a coil spring, but which may also comprise an elastic strap or any other suitable extensible biasing means. The spring may be mounted to front end door panel 46 by suitable connecting means 50, such as a stud and plate, or riveted plate, etc. The belt then doubles back toward the rear half of the door where it emerges through an opening 54 in the inner door panel 56. Since this inner door panel 56 is conventionally formed of cardboard or similar material, the opening is simple to provide. This opening is preferably diagonal to accommodate moving seat adjustment without placing stress on the inner door liner where it emerges. The particular shape, orientation, and/or location of the opening may of course be varied to suit the surrounding structure. An escutcheon plate may also be used with suitable sliding surface area to minimize wear of the belt and panel, and to increase the aesthetic appearance.

The bias of spring 48 may be predetermined so as not to retract the buckle end of the belt completely inside the door housing. Alternatively, a suitable stop means 55 may be provided on the belt connecting means 16 to prevent the belt from being drawn completely inside the door. Or the belt buckle may merely be made larger than the opening to prevent complete withdrawal behind the panel.

The optimum positioning of the belt is like that shown. However, it is realized that the belt may be given a vertical orientation as well as a horizontal one as long as the outer belt end is mounted near the base of the seat back to provide good support in an impact situation. In other words, the end of the belt may be connected to the base of the door, or to a special rigid support inserted behind the inner panel. The double-back or doubled or folded position of the belt may be directed vertically or diagonally as desired. Normally, such orientation is limited by the window assembly and the available door space. However, in the rear seat of a two-door automobile, the belts may be mounted inside the panels and attached to the inner fender or some other support.

Operation

When it is desired to install the seat belt assembly illustrated in a used automobile, panels 56 are removed by disconnecting the conventional screws or clips 66. A hole is drilled through the rear panel 22 of the door. Opening 54 is cut into panel 56. Next studs 30 are placed through the opening in panel 22 and nut 31 is connected, along with plate 26 as desired. Next, a hole is drilled through the front panel 46 to connect the biasing means 48 and loop element 40. The belt is connected to the rear panel and passed through loop element 40, doubled back, and then passed through opening 54. Inner panel 56 is then reattached to the door or whatever. The opposite portion 14' is installed in the same manner.

When not in use, the seat belt portions are retracted by spring 48 so that connector 16 is adjacent the inner panel 56, with the main portion of the belt being within the door body to be conveniently out of the way. Entering passengers merely open the door and slide onto the seat 70 in a conventional manner with no discomfort. They then reach over to the door and grasp the connecting means 16, pulling the belt portions 14 and 14' out through openings 54 and 54' against the bias of extensible biasing means 48 (FIG. 2). The belt passes over roller or surface 42 during extension, and the connecting means 16 and 16' are interconnected as illustrated in FIG. 3. Preferably, the belts include markings to enable visual determination of the amount of extension, especially full extension. When fastened, the belt not only serves to retain the passengers (not shown) on the seat 70 in an optimum manner, but also the belt holds the doors 12 and 12' shut to prevent them from flying open in case the vehicle collides with another object or rolls over. The belt is in no way dependent upon the extensible connection at the front door panel, but relies completely upon the very rigid connection to the solid rear door panel 22.

When passengers wish to alight from the vehicle, they merely unbuckle connecting means 16 and 16', allowing the belt to be retracted behind the panels by the action of the biasing means 48. Thus, the belts are conveniently out of the way until desired for use again.

Of course, if the structure is to be installed in new automobiles, this is preferably done before panels 56 are placed on the doors. Also, it will be realized that plates 28 can be welded to the rear end panel 22 in a suitable manner, rather than connecting the belt by means of studs. It is also conceivable that extending reinforcing braces or the like could be attached adjacent the rear end of the panel for mounting the belt ends. However, in the simplified form of the invention, it is preferable to merely attach the belt ends directly to the rear end panel 22, since these panels are normally structurally sturdy elements.

It will be realized that each of the parts of the apparatus is relatively simple in nature, and inexpensive to form. The belt element may be of a conventional type. The only moving part is the extensible biasing means 48 which can be formed to last over a long life. Even if spring 48 or its substitute should fail, this will not detract from the safety features of the structure, but merely from the convenient retracting condition thereof. Thus, even with failure, it can be readily repaired with no safety features being lost in the interim.

For convenience, it may be desirable to fasten a stud belt and buckle 21 to the floor in the middle of the front seat. This enables attachment to buckle 16 to have a short belt around just the driver. Alternatively, it enables hook 23 on buckle 21 to be temporarily inserted in hole 25 on buckle 16' to hold belt 14' from being retracted when the driver wishes to depart temporarily.

Various other obvious modifications within the teachings of this invention will occur to those in the art upon studying the foregoing illustrated form described and explained. These obvious modifications are deemed to be part of this invention, which is to be limited only by the scope of the appended claims and the reasonably equivalent structures to those defined therein.

I claim:
1. In a vehicle having opposite doors with rigid, structural elements and inner decorative panels, and a seat, a seat belt assembly comprising, a pair of belt portions having interconnecting means on their inner ends; a pair of openings in said respective inner panels in said opposite doors adjacent the base of said seat; said belt portions extending through said openings into the base of said doors; the outer ends of said belt portions being rigidly affixed to said rigid structural elements of said doors behind said panels; and retraction means inside said doors operably engaged with the central sections of said belt portions and adapted to retract all of said belt portions except said interconnecting means behind said panels, in a manner such that said portions can be extended out said openings and interconnected, with the stress on said belts being applied to said rigidly affixed outer ends.

2. The apparatus in claim 1 wherein said retraction means includes a keeper and an extensible biasing means.

3. In a vehicle having doors on opposite sides thereof including rigid rear end panels, front end panels, outer panels and spaced inner decorative panels; a sturdy retractable seat belt apparatus comprising, a pair of belt portions having interconnecting means at one end of each belt; the other end of each belt extending into the space between said inner decorative panel and said outer panel and being rigidly secured to the rear end panel of the respective doors; extensible biasing means mounted on the front end panels of said respective doors inside said spaces; each of said belt portions extending from their secured position to a position adjacent said front end panel into operative engagement with said extensible biasing means, and then doubling back toward said rear end panel and protruding through said inner panel into the vehicle in a manner enabling extension of said interconnecting belt ends away from said doors by pulling against the force of said biasing means, while utilizing said rigid securement to withstand force on said belt portions.

4. In an automobile having opposite doors with inner panels, outer panels, and rigid narrow, vertically elongated front and rear end panels, an extensible seat belt assembly comprising: a pair of interconnectable belt portions; the outer ends of each belt portion normally extending through an opening in the respective inner panel adjacent the rear thereof, through a keeper means adjacent the respective front end panel, and doubling back to the respective rear end panel; said belt ends being rigidly affixed to said rear end panels; and each of said keeper means being attached to an extensible biasing means, whereby each of said portions may be extended against the biasing force out said opening for interconnecting between said doors.

References Cited by the Examiner
UNITED STATES PATENTS

| | | | |
|---|---|---|---|
| 2,071,903 | 2/37 | Shively | 297—388 |
| 2,798,539 | 7/57 | Johnson | 297—388 |
| 2,854,248 | 9/58 | Stocker | 250—150 |
| 2,855,028 | 10/58 | Matthews | 297—388 |
| 2,937,882 | 5/60 | Oppenheim | 297—388 |
| 2,963,080 | 12/60 | Zang | 297—388 |
| 3,032,374 | 5/62 | Robinson | 297—388 |
| 3,061,331 | 10/62 | Lantis | 250—150 |
| 3,065,027 | 11/62 | Misslich | 297—388 |

FRANK B. SHERRY, *Primary Examiner.*